United States Patent
Inoue et al.

(10) Patent No.: US 7,857,466 B2
(45) Date of Patent: Dec. 28, 2010

(54) PROJECTION-TYPE IMAGE DISPLAY DEVICE HAVING ILLUMINANCE IMPROVING COEFFICIENT CALCULATOR

(75) Inventors: Masutaka Inoue, Hirakata (JP); Susumu Tanase, Kadoma (JP); Takaaki Abe, Osaka (JP)

(73) Assignee: Sanyo Electric Co., Ltd, Moriguchi-shi (JP)

( * ) Notice: Subject to any disclaimer, the term of this patent is extended or adjusted under 35 U.S.C. 154(b) by 620 days.

(21) Appl. No.: 11/869,031

(22) Filed: Oct. 9, 2007

(65) Prior Publication Data
US 2008/0084509 A1    Apr. 10, 2008

(30) Foreign Application Priority Data
Oct. 10, 2006   (JP) ............... 2006-276782
Aug. 28, 2007   (JP) ............... 2007-221567

(51) Int. Cl.
*G03B 21/00* (2006.01)
(52) U.S. Cl. ................. 353/122; 353/85
(58) Field of Classification Search ............ 353/46, 353/85, 122
See application file for complete search history.

(56) References Cited

U.S. PATENT DOCUMENTS

2004/0201827 A1*  10/2004  Kojima ............... 353/81
2005/0212461 A1*   9/2005  Onishi ............... 315/291

FOREIGN PATENT DOCUMENTS

JP      11-305710      11/1999

* cited by examiner

*Primary Examiner*—Thanh X Luu
(74) *Attorney, Agent, or Firm*—Marvin A. Motsenbocker; Mots Law, PLLC

(57) ABSTRACT

A projection-type image display device has a solid light source and a light valve, and causes light emitted from the solid light source to perform scanning on the light valve along a predetermined scanning line. The projection-type image display device is provided with a modulation amount controller configured to control a modulation amount of the light valve according to an input video signal which is a video signal inputted to the projection-type image display device, and an output controller configured to determine a reference output according to the input video signal. The output controller controls an output of the solid light source according to the reference output.

9 Claims, 14 Drawing Sheets

FIG. 5

| LUMINANCE OF AN IMAGE | CORRECTION AMOUNT ||
|---|---|---|
| | LUMINANCE IMPROVING COEFFICIENT ||
| | LARGE | SMALL |
| HIGH | $A_{large}$ | $A_{small}$ |
| MEDIUM | $B_{large}$ | $B_{small}$ |
| LOW | $C_{large}$ | $C_{small}$ |

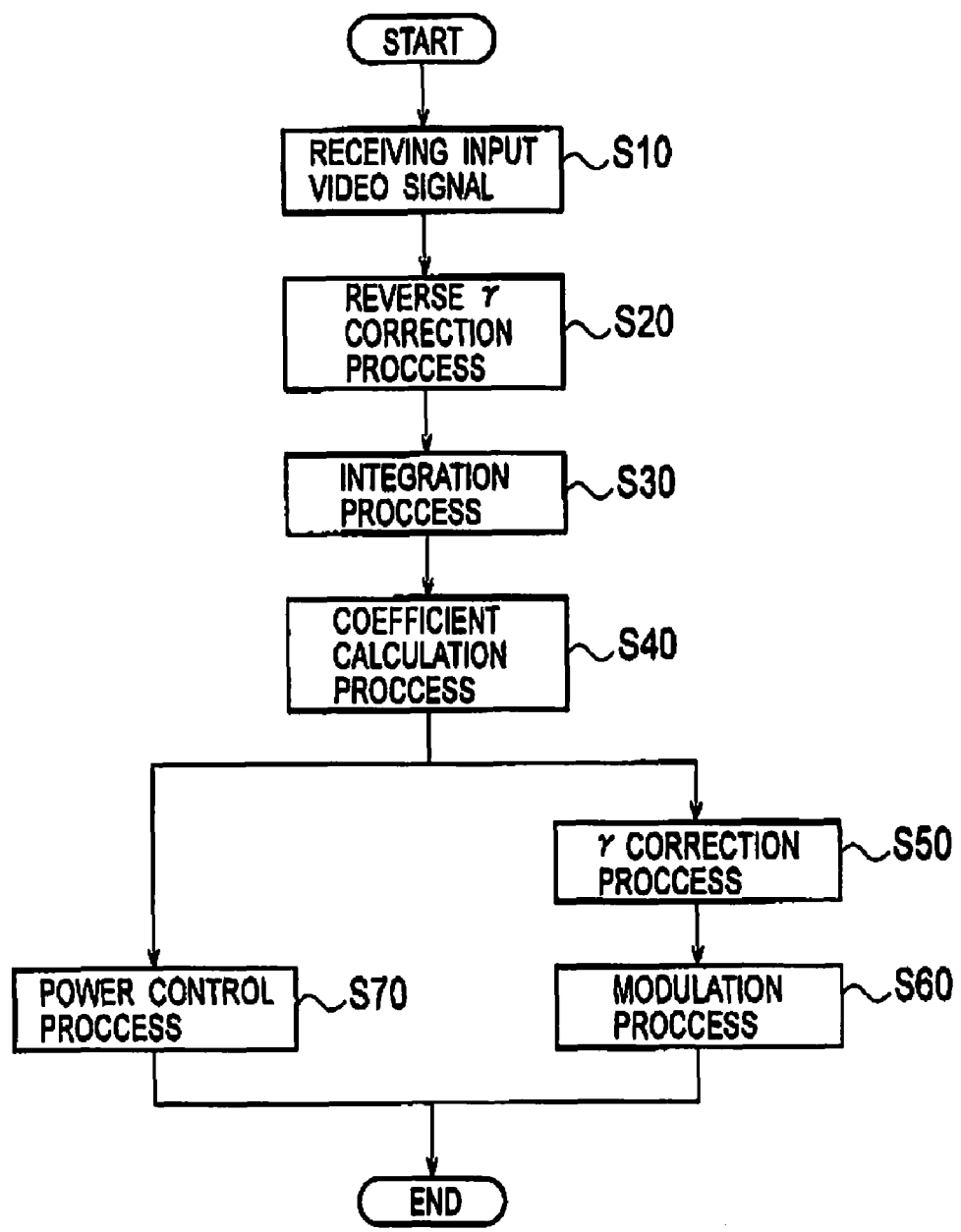

| FRAME NO. | 1 | 2 | 3 | 4 | 5 | 6 | 7 | 8 | 9 | 10 |
|---|---|---|---|---|---|---|---|---|---|---|
| LUMINANCE IMPROVING COEFFICIENT | 1.0 | 1.2 | 1.2 | 1.5 | 2.0 | 2.0 | 1.5 | 1.2 | 1.0 | 1.0 |
| TWO-FRAME MEAN VALUE | 1.0 | 1.1 | 1.2 | 1.4 | 1.8 | 2.0 | 1.8 | 1.4 | 1.1 | 1.0 |

US 7,857,466 B2

PROJECTION-TYPE IMAGE DISPLAY DEVICE HAVING ILLUMINANCE IMPROVING COEFFICIENT CALCULATOR

CROSS REFERENCE TO RELATED APPLICATIONS

This application is based upon and claims the benefit of priority from prior Japanese Patent Application No. 2006-276782, filed on Oct. 10, 2006; and Japanese Patent Application No. 2007-221567, filed on Aug. 28, 2007; the entire contents of which are incorporated herein by reference.

BACKGROUND OF THE INVENTION

1. Field of the Invention

The present invention relates to a projection-type image display device having a solid light source and a light valve, the projection-type image display device configured to cause light emitted from the solid light source to perform scanning on the light valve along a predetermined scanning line.

2. Description of the Related Art

Conventionally, there has been known a projection-type image display device which displays an image on a screen by irradiating a light valve with light emitted from a solid light source such as an LED (Light Emitting Diode) or an LD (Laser Diode). In addition, there has been also disclosed a technique that synchronizes an oscillation cycle of a pulse laser with a modulation cycle of a light valve when a solid light source is a pulse laser (see, for example, Japanese Patent Publication No. Heisei 11-305710 (claim 2, paragraph [0018], FIG. 1)).

A projection-type image display device displays an image on a screen by causing a spot of light emitted from a solid light source to perform scanning on a light valve along a predetermined scanning line. The light valve modulates light emitted from the solid light source to control an amount of light to be projected onto the screen. An output of the solid light source (that is, a voltage applied to the solid light source) is generally constant.

Here, an improvement in luminance of an image displayed on a screen is desired for a projection-type image display device. Meanwhile, under the condition that the output of the solid light source (that is, a voltage applied to the solid light source) is constant in the projection-type image display device, the contrast of an image tends to decline when luminance of the image displayed on the screen is low due to peripheral lighting effects or the like.

SUMMARY OF THE INVENTION

In an aspect of the present invention, a projection-type image display device has a solid light source (a solid light source 10) and a light valve (a liquid crystal panel 40), and causes light emitted from the solid light source to perform scanning on the light valve along a predetermined scanning line. The projection-type image display device is provided with a modulation amount controller (a γ corrector 260) configured to control a modulation amount of the light valve according to an input video signal which is an video signal inputted to the projection-type image display device and an output controller (a power controller 250) configured to determine a reference output according to the input video signal. The output controller controls an output of the solid light source according to the reference output.

According to the above aspect, the output controller determines the reference output according to an input video signal, and controls the output of the solid light source according to the reference output. Thus, when luminance of an image is low, the output of the solid light source is reduced so that the contrast of the image can be improved, whereas when luminance of an image is high, the output of the solid light source is increased so that luminance of an image can be improved.

In the above aspect, the projection-type image display device is further provided with an integrator (an integrator 230) configured to integrate the input video signal to calculate an integrated value corresponding to the predetermined scanning line and a calculator (a calculator 240) configured to calculate a luminance improving coefficient based on the integrated value calculated by the integrator. The luminance improving coefficient is to be multiplied by the reference output. The output controller controls the output of the solid light source according to a value obtained by multiplying the reference output by the luminance improving coefficient.

In the above aspect, the predetermined scanning line is configured of a plurality of predetermined scanning lines (scanning lines $L_1$ to $L_n$), the integrator calculates the integrated value for each of the plurality of scanning lines and the calculator specifies a representative value based on the integrated value calculated for each of the plurality of scanning lines. The calculator calculates the luminance improving coefficient based on the representative value.

In the above aspect, the projection-type image display device is further provided with a reverse γ corrector (a reverse γ corrector 220) configured to perform reverse γ correction process on the input video signal. The integrator calculates the integrated value by integrating the input video signal on which the reverse γ correction process is performed.

In the above aspect, the projection-type image display device is further provided with a γ corrector (a γ corrector 260) configured to perform γ correction process on the input video signal according to the luminance improving coefficient, the input video signal on which the reserves γ correction process is performed. The modulation amount controller controls a modulation amount according to the input video signal on which the γ correction process is performed.

In the above aspect, the γ corrector performs the γ correction process, in which luminance of an image when the luminance improving coefficient is large would be lower than luminance of an image when the luminance improving coefficient is small.

In the above aspect, the projection-type image display device is further provided with an integrator configured to integrate the input video signal to calculate an integrated value corresponding to the entire light valve and a calculator configured to calculate a luminance improving coefficient based on the integrated value calculated by the integrator. The luminance improving coefficient is to be multiplied by the reference output. The output controller controls the output of the solid light source according to a value obtained by multiplying the reference output by the luminance improving coefficient.

In the above aspect, the projection-type image display device is further provided with a light modulation surface of the light valve configured of a plurality of divided regions, an integrator integrating the input video signal to calculate an integrated value corresponding to each of the plurality of divided regions, and a calculator calculating a luminance improving coefficient based on the integrated value calculated by the integrator. The luminance improving coefficient is to be multiplied by the reference output. The output controller controls the output of the solid light source according to a value obtained by multiplying the reference output by the luminance improving coefficient.

In the above aspect, a light modulation surface of the light valve is configured of a plurality of unit regions. The output controller is capable of controlling the output of the solid light source for each of the plurality of unit regions. The calculator adjusts the luminance improving coefficient so as to reduce a difference between the luminance improving coefficients of one unit region and other unit region adjacent to the one unit region. The one unit region and the other unit region are unit regions included in the plurality of unit regions.

In the above aspect, the input video signal is a signal corresponding to a plurality of frames. The output controller is capable of controlling an output of the solid light source for each of the plurality of frames. The calculator adjusts the luminance improving coefficient so as to reduce a deference between the luminance improving coefficients of one frame and other frame subsequent to the one frame. The one frame and the other frame are included in the plurality of frames.

BRIEF DESCRIPTION OF THE DRAWINGS

FIG. 5 is a table showing one example of a correction amount in γ correction process according to the first embodiment;

FIG. 7 is a flowchart showing an operation of the projection-type image display device 100 according to the first embodiment;

DESCRIPTION OF PREFERRED EMBODIMENTS

Figure 1:
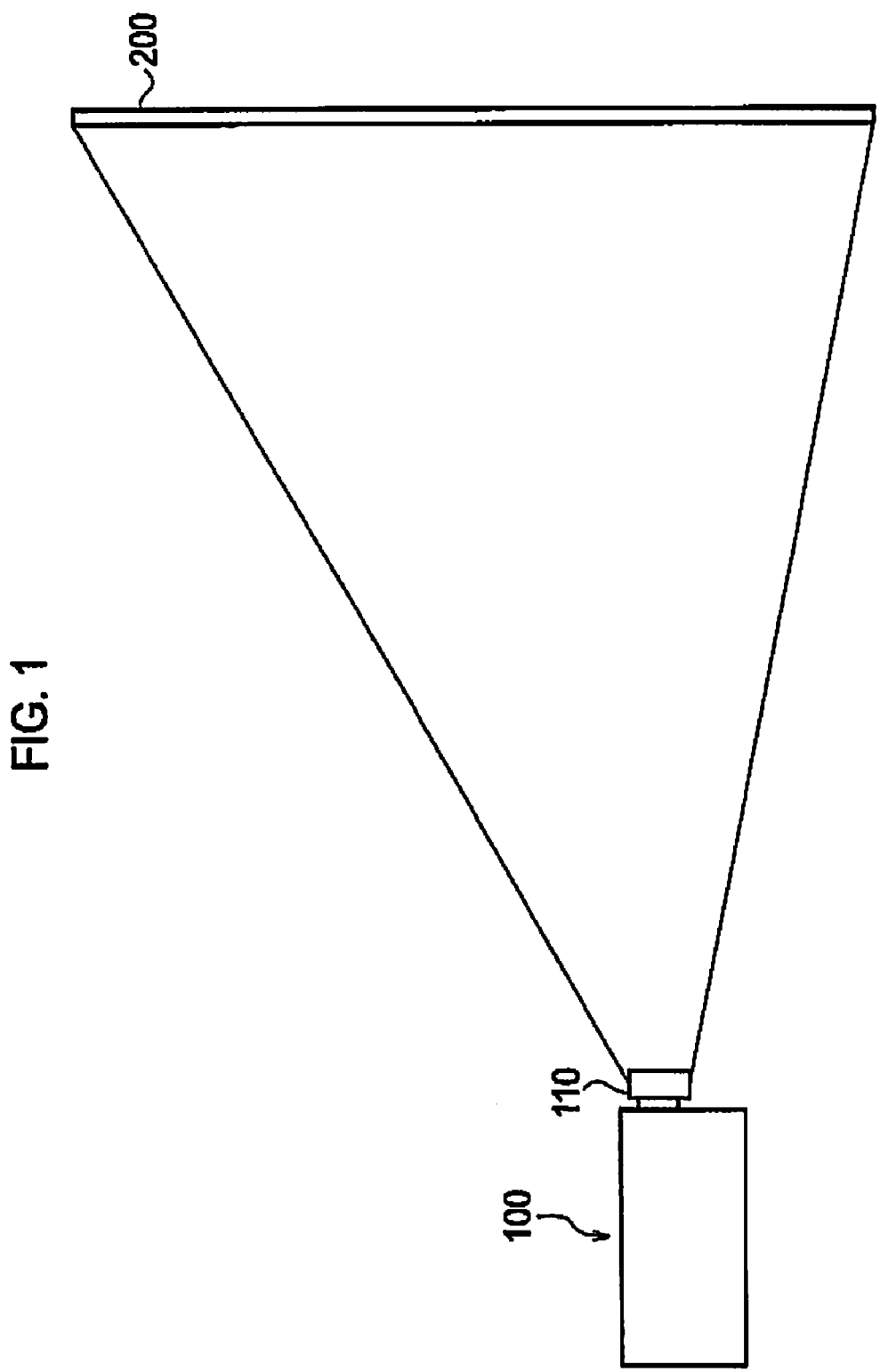
FIG. 1 is a view schematically showing a projection-type image display device 100 according to a first embodiment.

A projection-type image display device according to preferred embodiments of the present invention will be descried below by referring to the drawings. Note that same or similar reference numerals are given to denote same or similar portions in the drawings.

In addition, the drawings are merely schematically shown and proportions of sizes and the like are different from actual ones. Thus, specific sizes and the like should be judged by referring to the description below. In addition, there are of course included portions where relationships or proportions of sizes of the drawings are different with respect to one another.

First Embodiment

Outline of a Projection-Type Image Display Device

An outline of a projection-type image display device according to a first embodiment of the present invention will be described below by referring to the drawings. FIG. 1 is a view schematically showing a projection-type image display device 100 according to the first embodiment.

As shown in FIG. 1, the projection-type image display device 100 has a projection lens unit 110 and projects image light enlarged by the projection lens unit 110 onto a screen 200. The projection-type image display device 100 has a solid light source such as an LED (Light Emitting Diode) or an LD (Laser Diode) as a light source.

(Schematic Configuration of a Lighting Unit)

Figure 2:
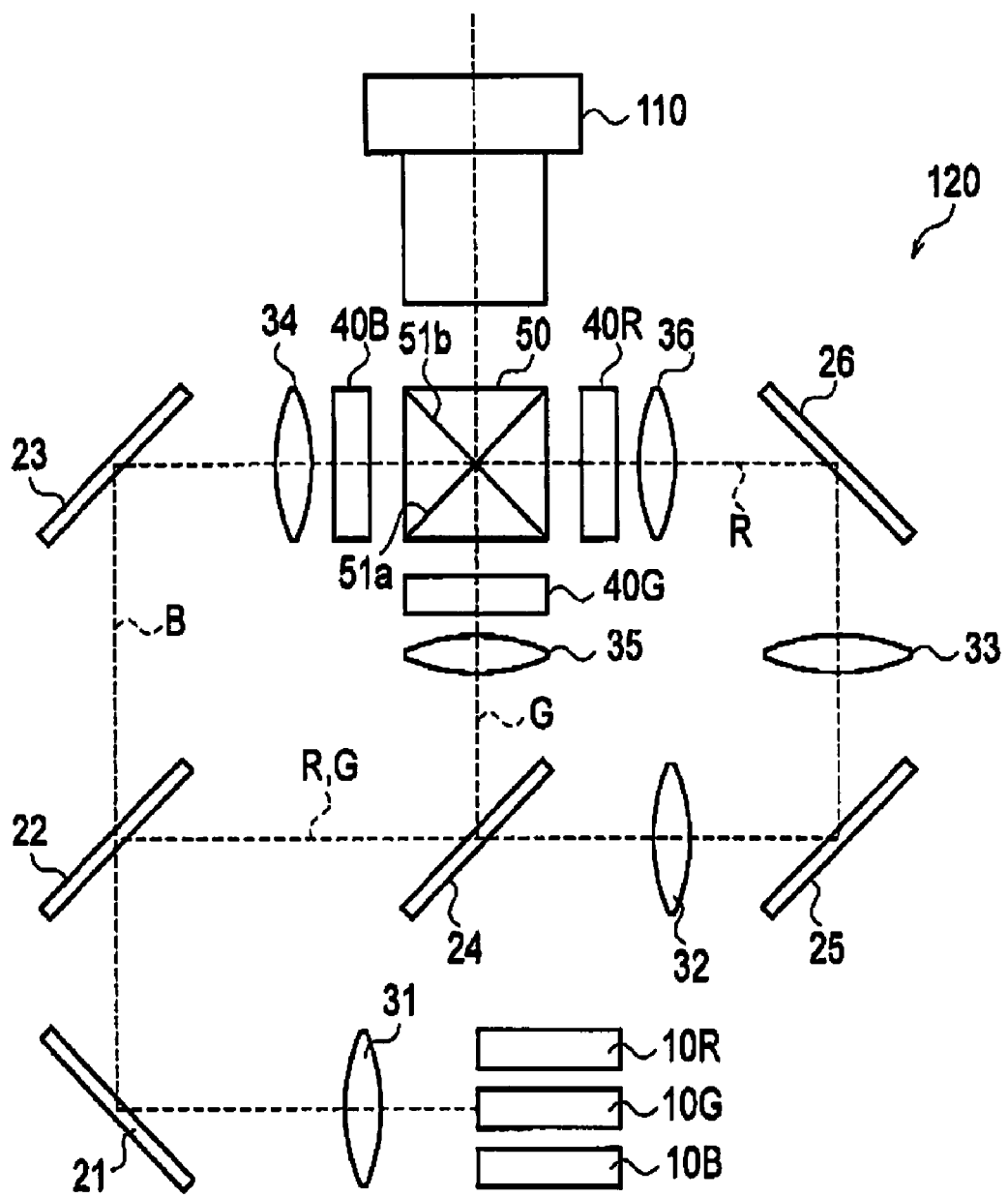
FIG. 2 is a view schematically showing a configuration of a lighting unit 120 according to the first embodiment.

A schematic configuration of a lighting unit according to the first embodiment will be described below by referring to the drawing. FIG. 2 is a view schematically showing a configuration of a lighting unit 120 according to the first embodiment.

As shown in FIG. 2, the lighting unit 120 has a plurality of solid light sources 10 (solid light sources 10R, 10G, and 10B), a plurality of mirrors (mirrors 21 to 26), a plurality of lenses (lenses 31 to 36), a plurality of liquid crystal panels (liquid crystal panels 40R, 40G, and 40B), and a cross dichroic cube 50.

The solid light source 10R is a solid light source such as an LED or LD which emits red component light. The solid light source 10R has directivity and the red component light emitted from the solid light source 10R is spot light. Similarly, the solid light sources 10G and 10B are solid light sources such as an LED or LD, which respectively emit green component light and blue component light. The solid light sources 10G and 10B have directivity and the green component light and the blue component light, which are respectively emitted by the solid light sources 10G and 10B, are spot light. Note that a shape of the spot light emitted from each of the solid light sources may be adjusted to be a line shape (a rectangular shape) by a special lens or the like.

The mirror 21 is a reflector reflecting light emitted from each of the solid light sources 10. The mirror 22 is a dichroic mirror transmitting the blue component light and reflecting the red and green component light. The mirror 23 is a reflector reflecting the blue component light to a liquid crystal panel 40B side. The mirror 24 is a dichroic mirror transmitting the red component light and reflecting the green component light to a liquid crystal panel 40G side. The mirrors 25 and 26 are reflectors reflecting the red component light to lead it to a liquid crystal panel 40R side.

The lenses 31 to 36 collect light emitted from each of the solid light sources 10 to each of the liquid crystal panels 40. Here, the lenses 32 and 33 are relay lenses provided to adjust a difference between an optical path length of the green and blue component light and an optical path length of the red component light.

The liquid crystal panel 40R is a light valve which modulates the red component light emitted from the solid light source 10R according to a red input signal $R_{in}$, to control a light amount of the red component light to be projected on the screen 200. Similarly, the liquid crystal panels 40G and 40B are light valves which respectively modulate the green component light and the blue component light respectively emitted by the solid light sources 10G and 10B according to a green input signal $G_{in}$ and a blue input signal $B_{in}$, to control light amounts of the green and blue component light to be projected on the screen 200.

Here, note that the spot light emitted from each of the solid light sources 10 is caused to perform scanning on each of the light valves (see, FIG. 3) along predetermined scanning lines (in horizontal and vertical lines).

The cross dichroic cube 50 combines the red component light, the green component light, and the blue component light, which are respectively outputted from the liquid crystal panels 40R, 40G, and 40B. Specifically, the cross dichroic cube 50 has a mirror surface 51a which reflects the red component light to a projection lens unit 110 side and transmits the green component light to the projection lens unit 110 side and a mirror surface 51b which reflects the blue component light to the projection lens unit 110 side and transmits the green component light to the projection lens unit 110 side.

(Scanning Method of Light Emitted from the Solid Light Source)

Figure 3A:
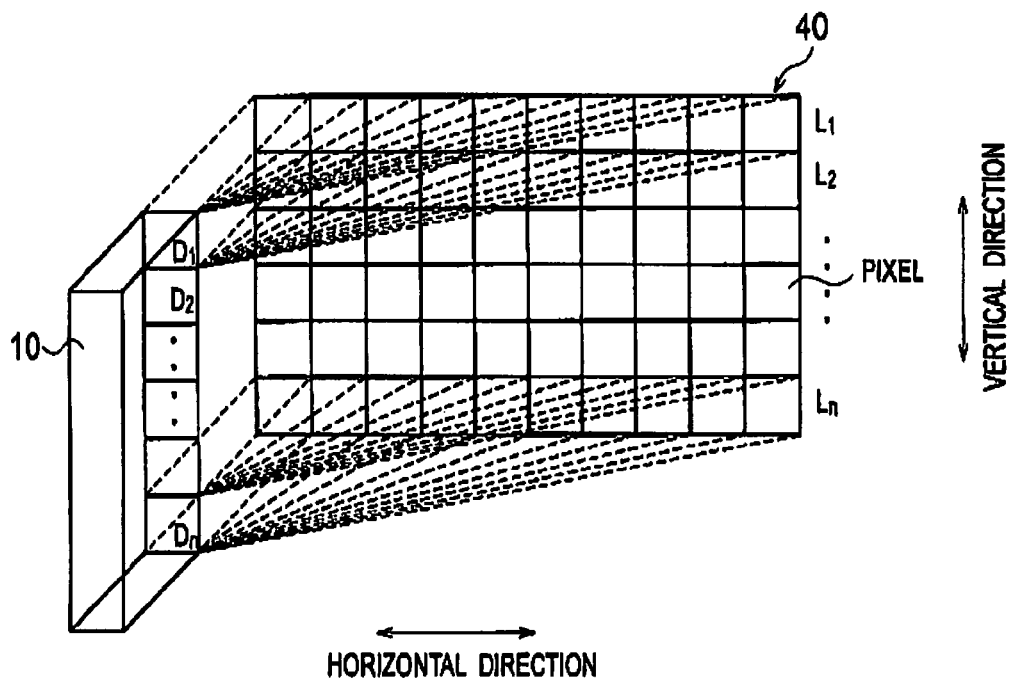
FIGS. 3A and 3B are views showing a scanning method of light emitted from a solid light source 10 according to the first embodiment.
Figure 3B:
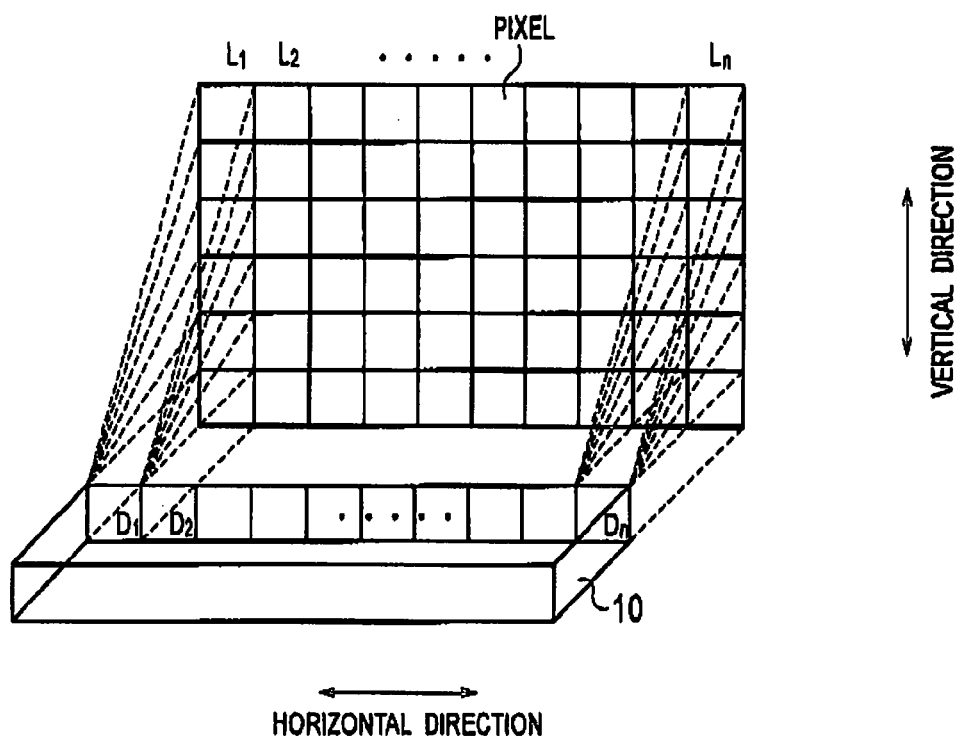

A scanning method of light emitted from the solid light sources 10 according to the first embodiment will be described below by referring to the drawings. FIG. 3A is a conceptual view showing horizontal scanning. FIG. 3B is a conceptual view showing vertical scanning.

As shown in FIG. 3A, in the horizontal scanning, the solid light source 10 has an arrayed configuration in which a plurality of light-emitting elements (light-emitting elements $D_1$ to $D_n$) is arrayed in the vertical direction. The liquid crystal panel 40 has a configuration in which pixels are arrayed in the horizontal and vertical directions, each pixel being a unit of which light amount is controlled by input video signals (a red input signal $R_{in}$, a green input signal $G_{in}$, and a blue input signal $B_{in}$).

Here, spot light emitted from each of the light-emitting elements is caused to perform scanning along each of scanning lines (scanning lines $L_1$ to $L_n$) which are lines in the horizontal direction. For example, the spot light emitted from the light-emitting element $D_1$ is caused to perform scanning along the scanning line $L_1$ and the spot light emitted from the light-emitting element $D_n$ is caused to perform scanning along the scanning line $L_n$.

On the other hand, as shown in FIG. 3B, in the vertical scanning, the solid light source 10 has an arrayed configuration in which a plurality of light-emitting elements (light-emitting elements $D_1$ to $D_n$) is arrayed in the horizontal direction. The liquid crystal panel 40 has a configuration in which pixels are arrayed in the horizontal and vertical directions, each pixel being a unit of which light amount is controlled by input video signals (a red input signal $R_{in}$, a green input signal $G_{in}$, and a blue input signal $B_{in}$).

Here, the spot light emitted from each of the light-emitting elements is caused to perform scanning along each of scanning lines (scanning lines $L_1$ to $L_n$) in the vertical direction. For example, the spot light emitted from the light-emitting element $D_1$ is caused to perform scanning along the scanning line $L_1$, and the spot light emitted from the light-emitting element Dn is caused to perform scanning along the scanning line $L_n$.

(Configuration of a Control Unit)

Figure 4:
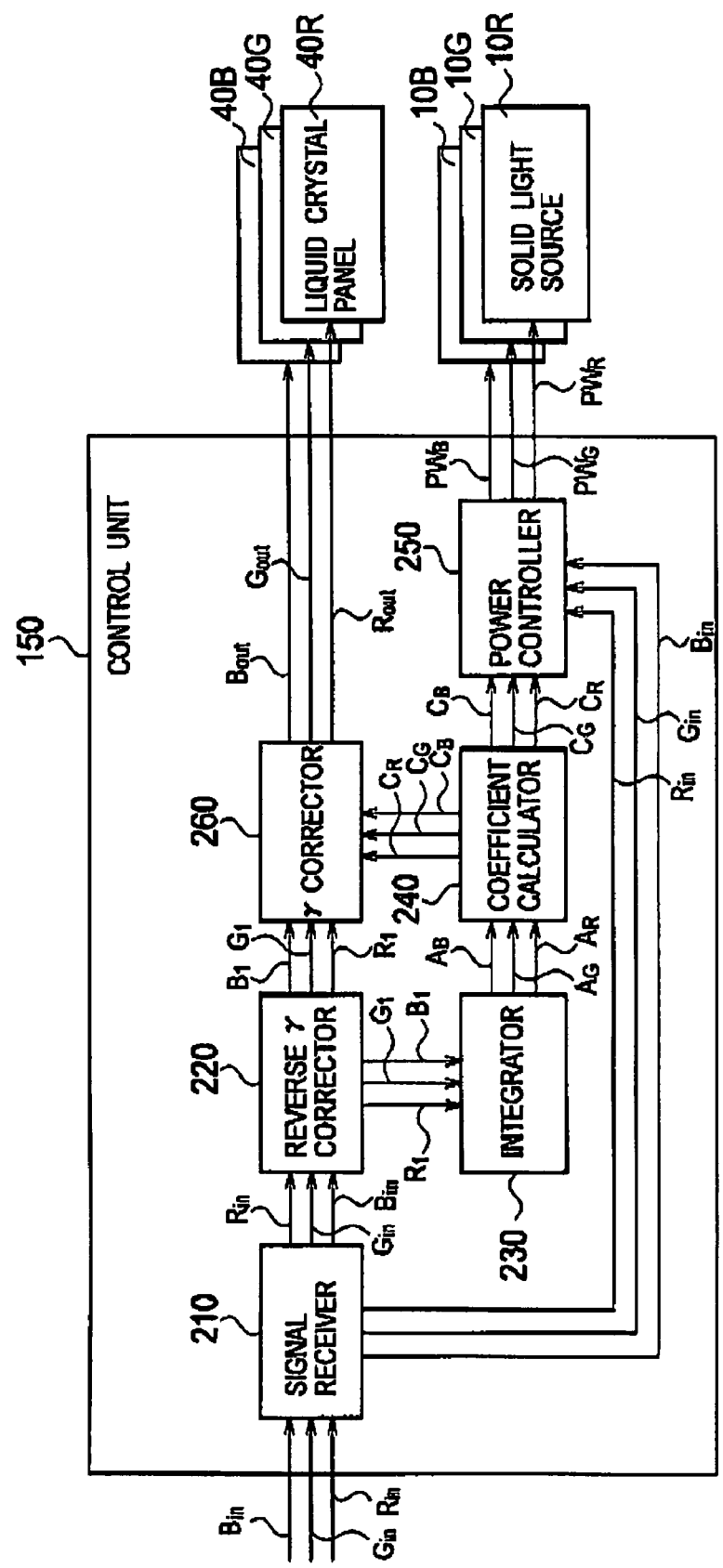
FIG. 4 is a block diagram showing a configuration of a control unit 150 according to the first embodiment.

A configuration of a control unit provided in the projection-type image display device according to the first embodiment will be described by referring to the drawing. FIG. 4 is a block diagram showing a configuration of a control unit 150 according to the first embodiment.

As shown in FIG. 4, the control unit 150 has a signal receiver 210, a reverse γ corrector 220, an integrator 230, a coefficient calculator 240, a power controller 250, and a γ corrector 260.

The signal receiver 210 is configured to receive a red input signal $R_{in}$, a green input signal $G_{in}$, and a blue input signal $B_{in}$ as input video signals. The input video signals are adjusted according to a relationship between a voltage applied to the liquid crystal panel 40 and an output light outputted from the liquid crystal panel 40.

The reverse γ corrector 220 is configured to perform reverse γ correction process on the input video signals (the red input signal $R_{in}$, the green input signal $G_{in}$, and the blue input signal $B_{in}$). The reverse γ correction process is to correct the input video signals so that the input video signals and luminance determined according to the input video signals would have linearity. The reverse γ corrector 220 inputs, into the integrator 230, the input video signals (the red input signal $R_{in}$, the green input signal $G_{in}$, and the blue input signal $B_{in}$) on which the reverse γ correction process is performed.

The integrator 230 is configured to integrate the input video signals (the red input signal $R_{in}$, the green input signal $G_{in}$, and the blue input signal $B_{in}$) on which the reverse γ correction process is performed for each scanning line, to calculate integrated values (integrated values $A_R$, $A_G$ and $A_B$) each corresponding to the scanning lines. Note that the output maximum value of the solid light source 10 should be a value determined according to a voltage to be applied to the solid light source 10 from viewpoints of durability of the solid light source 10 and energy conservation.

The coefficient calculator 240 is configured to calculate luminance improving coefficients (luminance improving coefficients $C_R$, $C_G$, and $C_B$) each corresponding to the solid light sources 10 based on the integrated values (the integrated values $A_R$, $A_G$ and $A_B$) each corresponding to the scanning lines. Specifically, the coefficient calculator 240 specifies a representative value from the integrated values each corresponding to the scanning lines to calculate luminance improving coefficients each corresponding to the solid light sources 10 based on the specified representative value. Note that the representative value may be the integrated value which is the largest value of the integrated values each corresponding to the scanning lines $L_1$ to $L_n$ or may be a mean value of the integrated values each corresponding to the scanning lines $L_1$ to $L_n$.

It is preferable that the luminance improving coefficients (the luminance improving coefficients $C_R$, $C_G$, and $C_B$) be in common among the plurality of light-emitting elements (the light-emitting elements $D_1$ to $D_n$) included in each of the solid light sources 10. With this, it can be suppressed that the luminance of an image varies for each scanning line because luminance improving coefficients are different for each of the plurality of light-emitting elements.

Note that as the integrated values (the integrated values $A_R$, $A_G$ and $A_B$) each corresponding to the scanning lines are smaller, the luminance improving coefficients (the luminance improving coefficients $C_R$, $C_G$, and $C_B$) can be made larger.

Here, note that the coefficient calculator 240 calculates the luminance improving coefficients to the extent that the integrated value of outputs of the solid light source 10 controlled by the power controller 250 in a predetermined observation period does not exceed the integrated value of maximum output values of the solid light source 10.

The power controller 250 is configured to control an output of each of the solid light sources 10 according to reference outputs determined according to the input video signals (the red input signal $R_{in}$, the green input signal $G_{in}$, and the blue input signal $B_{in}$). Specifically, the power controller 250 controls an output of each solid light source 10 according to each of values ($PW_R$, $PW_G$, and $PW_B$) obtained by multiplying the reference output determined for each solid light source 10 by each of the luminance improving coefficients (the luminance improving coefficients $C_R$, $C_G$, and $C_B$). Note that the reference output is determined according to a mean value, maximum value, or minimum value of the input video signal in a period (hereinafter referred to as an output control period) for controlling an output of each solid light source 10.

The γ corrector 260 is configured to perform γ correction process on the input signals (the red input signal $R_1$, the green input signal $G_1$, and the blue input signal $B_1$) on which the reverse γ correction process is performed to input output video signals (a red output signal $R_{out}$, a green output signal $G_{out}$, and a blue output signal $B_{out}$) being video signals, on which the γ correction process is performed, into the liquid crystal panels 40. The γ correction process is to correct an input video signal on which the reverse γ correction process is performed according to a relationship between an input video signal (a desired light amount) on which the reverse γ correction process is performed and an output video signal (a voltage applied to the liquid crystal panel 40).

The γ corrector 260 changes a correction amount used in the γ correction process according to the luminance improving coefficient. Specifically, as shown in FIG. 5, in a case where the luminance improving coefficient is large, the γ corrector 260 uses a correction amount $A_{large}$ when luminance of an image is high, uses a correction amount $B_{large}$ when luminance of an image is medium, and uses a correction amount $C_{large}$ when luminance of an image is low. In contrast, in a case where the luminance improving coefficient is small, the γ corrector 260 uses a correction amount $A_{small}$ when luminance of an image is high, uses a correction amount $B_{small}$ when luminance of an image is medium, and uses a correction amount $C_{small}$ when luminance of an image is low.

A relationship among the correction amounts $A_{large}$, $B_{large}$, $C_{large}$ is $A_{large} > B_{large} > C_{large}$. A relationship among the correction amounts $A_{small}$, $B_{small}$, and $C_{small}$ is $A_{small} > B_{small} > C_{small}$. A relationship between the correction amounts $A_{large}$ and $A_{small}$ is $A_{large} \approx A_{small}$. A relationship between the correction amounts $B_{large}$ and $B_{small}$ is $B_{large} < B_{small}$. A relationship between the correction amounts $C_{large}$ and $C_{small}$ is $C_{large} < C_{small}$. Note that a value of $C_{small} - C_{large}$ is larger than a value of $B_{small} - B_{large}$.

In this manner, if the luminance improving coefficient is large, a correction amount used in the γ correction process is determined so that luminance of an image would be lower than luminance of an image to be determined when the luminance improving coefficient is small. In particular, in a case where the luminance of an image is low, if the large luminance improving coefficient is large, a correction amount used in the γ correction is determined so that luminance of an image would be lower than luminance of an image to be determined when the luminance improving coefficient is small.

(One Example of Output Control of the Solid Light Source 10)

Figure 6A:
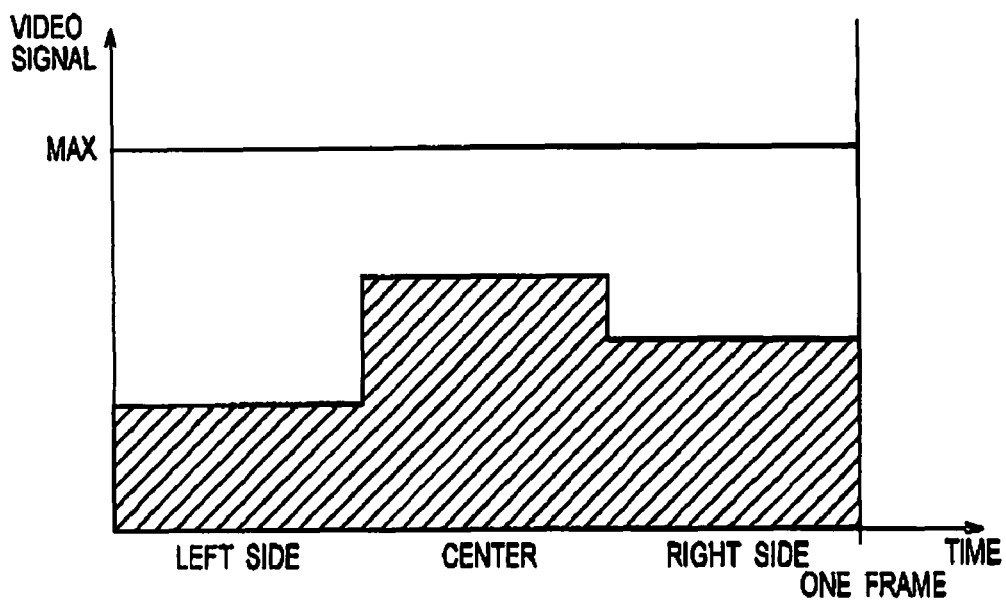
FIGS. 6A and 6B are graphs showing one example of output control of the solid light source 10 according to the first embodiment.
Figure 6B:
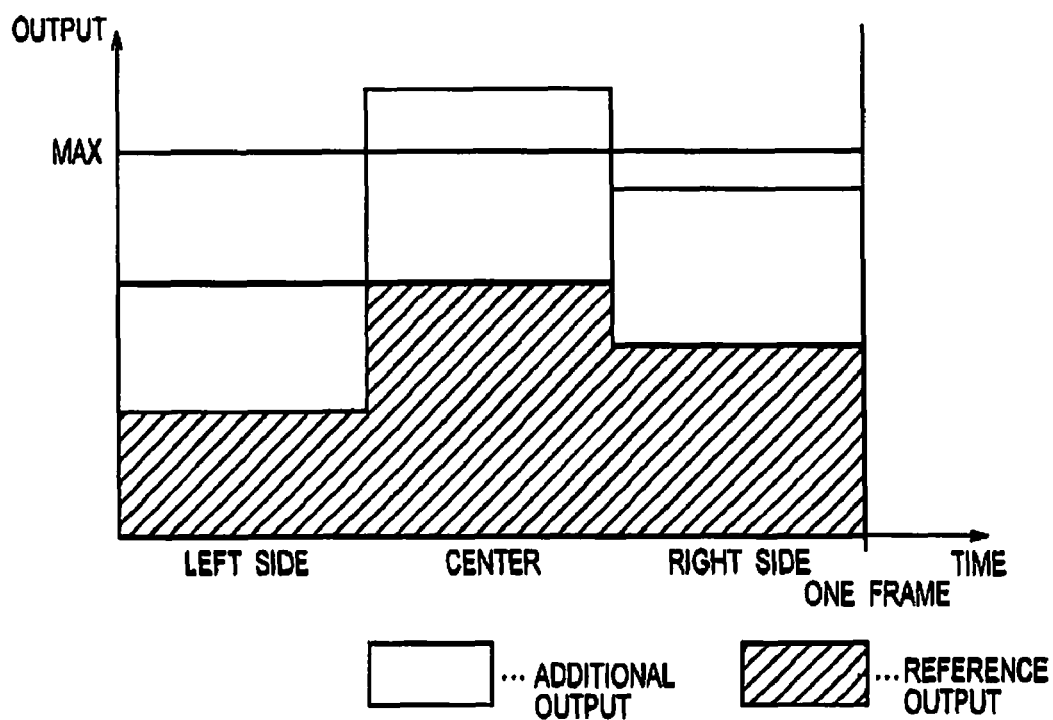

One example of output control of the solid light source 10 according to the first embodiment will be described below by referring to the drawings. FIGS. 6A and 6B are graphs showing one example of output control of the solid light source 10 according to the first embodiment. Note that in FIGS. 6A and 6B, there will be described an example that luminance on the left and right sides of a scanning line is lower than luminance in the center of the scanning line. Note that a period (an output control period) controlling an output of the solid light source 10 is a period that one frame is divided into three.

As shown in FIG. 6A, the projection-type image display device 100 integrates input video signals on which reverse γ correction process is performed for each scanning line, to calculate integrated values each corresponding to the scanning lines. Next, the projection-type image display device 100 calculates luminance improving coefficients based on the integrated values.

As shown in FIG. 6B, the projection-type image display device 100 takes values, as outputs of the solid light source 10, obtained by respectively multiplying reference outputs determined depending on the input video signals by the luminance improving coefficients. That is, an output of the solid light source 10 is to be an output that a reference output and an additional output are combined.

In this manner, in the center of the scanning line, the value obtained by multiplying the reference output by the luminance improving coefficient exceeds the output maximum value of the solid light source 10. However, on the left and right sides of the scanning line, the values obtained by respectively multiplying the reference outputs by the luminance improving coefficients do not exceed the output maximum value of the solid light source 10. In addition, in a predetermined observation period (here, in one frame), the integrated value obtained by multiplying the reference output by the luminance improving coefficient does not exceed the integrated value of the output maximum value of the solid light source 10.

Note that in FIG. 6B, the luminance improving coefficients each corresponding to the output control periods are equal, but they are not limited to this. Specifically, the luminance improving coefficients each corresponding to the output control periods may be changed on the basis of mean luminance of the output control periods. For example, the luminance improving coefficient corresponding to the output control period in the center where the mean luminance is high may be larger than the luminance improving coefficient corresponding to the output control period on the left and right sides where the mean luminance is low. The luminance improving coefficient corresponding to the output control period on the left and right sides where the mean luminance is low may be 1 (that is, the reference output is not needed to be changed).

(Operation of the Projection-Type Image Display Device 100)

An Operation of the projection-type image display device 100 according to the first embodiment will be described below by referring to the drawing. FIG. 7 is a flowchart showing an operation of the projection-type image display device 100 according to the first embodiment.

As shown in FIG. 7, at step S10, the projection-type image display device 100 receives a red input signal $R_{in}$, a green input signal $G_{in}$, and a blue input signal $B_{in}$ as input video signals.

At step S20, the projection-type image display device 100 performs reverse γ correction process on the input video signals (the red input signal $R_{in}$, the green input signal $G_{in}$, and the blue input video signal $B_{in}$) to correct the input video signals so that the input video signals and luminance determined according to the input video signals would have linearity.

At step S30, the projection-type image display device 100 integrates the input video signals (the red input signal $R_{in}$, the green input signal $G_{in}$, and the blue input video signal $B_{in}$) on which the reverse γ correction process is performed for each scanning line, to calculate integrated values (integrated values $A_R$, $A_G$, and $A_B$) each corresponding to the scanning lines.

At step S40, the projection-type image display device 100 calculates the luminance improving coefficients (the luminance improving coefficients $C_R$, $C_G$, and $C_B$) each corresponding to the solid light sources 10 based on the integrated values (the integrated values $A_R$, $A_G$, and $A_B$) each corresponding to the scanning lines.

At step S50, the projection-type image display device 100 performs γ correction process on the input video signals (the red input signal $R_1$, the green input signal $G_1$, and the blue input signal $B_1$) on which the reverse γ correction process is performed after a γ value used in the γ correction process is changed according to the luminance improving coefficients.

At step S60, the projection-type image display device 100 modulates light emitted from each of the solid light sources 10 according to output video signals (a red output signal $R_{out}$, a green output signal $G_{out}$, and a blue output signal $B_{out}$) on which the γ correction process is performed.

At step S70, the projection-type image display device 100 controls an output of each of the solid light sources 10 according to values ($PW_R$, $PW_G$, or $PW_B$) obtained by multiplying the reference output determined for each of the solid light sources 10 by each of the luminance improving coefficients (the luminance improving coefficient $C_R$, $C_G$, or $C_B$).

Note that the process at steps S60 and S70 is of course performed in synchronization with respect to each other. To synchronize the process at steps S60 and S70, a frame buffer capable of storing a video signal corresponding to one frame may be used.

(Advantageous Effects)

According to the projection-type image display device 100 of the first embodiment, the power controller 250 determines a reference output according to an input video signal to control an output of the solid light source 10 according to the reference output. Thus, when luminance of an image is low, the output of the solid light source 10 is reduced, so that the contrast of the image can be improved, whereas when luminance of an image is high, the output of the solid light source 10 is increased, so that the luminance of the image can be improved.

According to the projection-type image display device 100 of the first embodiment, the power controller 250 controls an output of the solid light source 10 according to the reference output determined on the basis of the input video signal. Thus, the output of the solid light source 10 can be suppressed while maintaining a necessary light amount.

The coefficient calculator 240 calculates a luminance improving coefficient based on the integrated value of the input video signals, and the power controller 250 controls the output of the solid light source 10 according to the value obtained by multiplying the reference output by the luminance improvement coefficient. With this, excessive power that is generated by suppressing the output of the solid light source 10 can be effectively used for improving the luminance of the image.

The coefficient calculator 240 calculates a luminance improving coefficient to the extent that the integrated value of outputs of the solid light source 10 does not exceed the integrated value of output maximum values of the solid light source 10 in a predetermined observation period. Thus, the output of the solid light source 10 will not exceed the maximum output value of the outputs of the solid light source 10 even if the output of the solid light source 10 temporarily exceeds the output maximum value of the solid light source 10 in a unit of time.

In this manner, the luminance of an image can be effectively improved while the output of the solid light source 10 in the predetermined observation period is maintained within a constant-value.

According to the projection-type image display device 100 of the first embodiment, the coefficient calculator 240 specifies a representative value from the integrated values each corresponding to the scanning lines to calculate the luminance improving coefficients each corresponding to the solid light sources 10 based on the specified representative value. Thus, it can be suppressed that the luminance of an image varies for each scanning line because luminance improving coefficients are different for each of the plurality of light-emitting elements included in the solid light source 10.

According to the projection-type image display device 100 of the first embodiment, the coefficient calculator 240 calculates luminance improving coefficients based on the integrated values of the input video signals (the red input signal $R_1$, the green input signal $G_1$, and the blue input signal $B_1$) on which the reverse γ correction process is performed. That is, the coefficient calculator 240 calculates the luminance improving coefficients after the input video signals are corrected so that the input video signals and the luminance determined according to the input video signals would have linearity. Thus, the calculation accuracy of luminance improving coefficient will be increased.

Second Embodiment

A second embodiment of the present invention will be described below by referring to the accompanying drawings. In the following, the description will be mainly given to denote differences between the above-mentioned first embodiment and the second embodiment.

Specifically, in the above-mentioned first embodiment, the integrated values (the integrated values $A_R$, $A_G$, and $A_B$) each corresponding to the scanning lines are integrated values corresponding to one frame (see, FIGS. 6A and 6B).

In contrast, in the second embodiment, integrated values (integrated values $A_R$, $A_G$, and $A_B$) each corresponding to scanning lines are integrated values corresponding to a plurality of frames (for example, two frames).

(One Example of Output Control of a Solid Light Source 10)

Figure 8A:
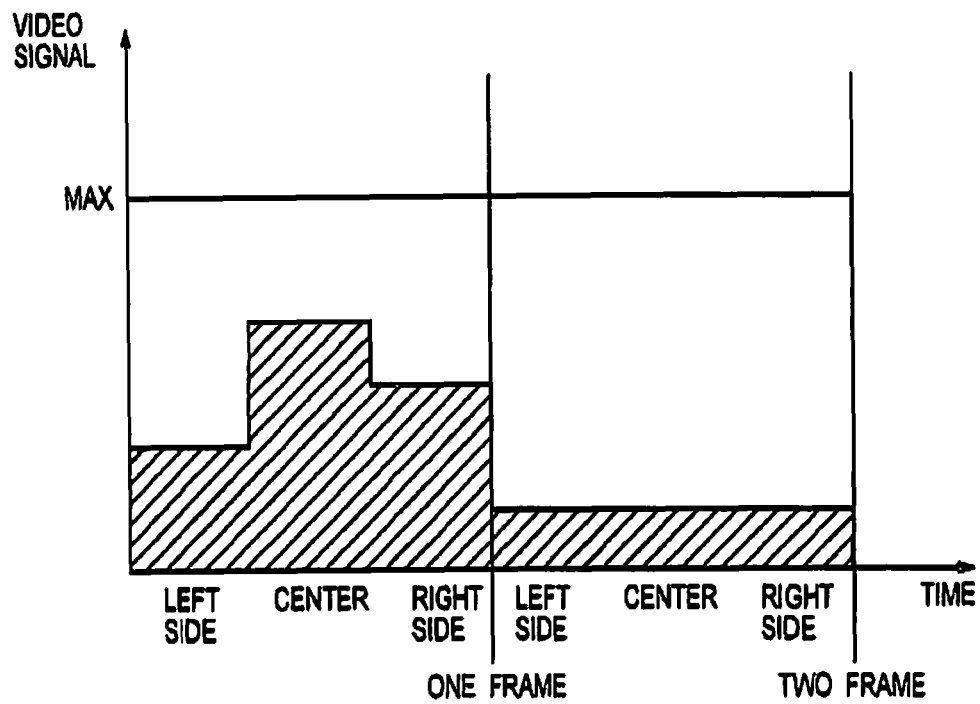
FIGS. 8A and 8B are graphs showing one example of output control of a solid light source 10 according to a second embodiment.
Figure 8B:
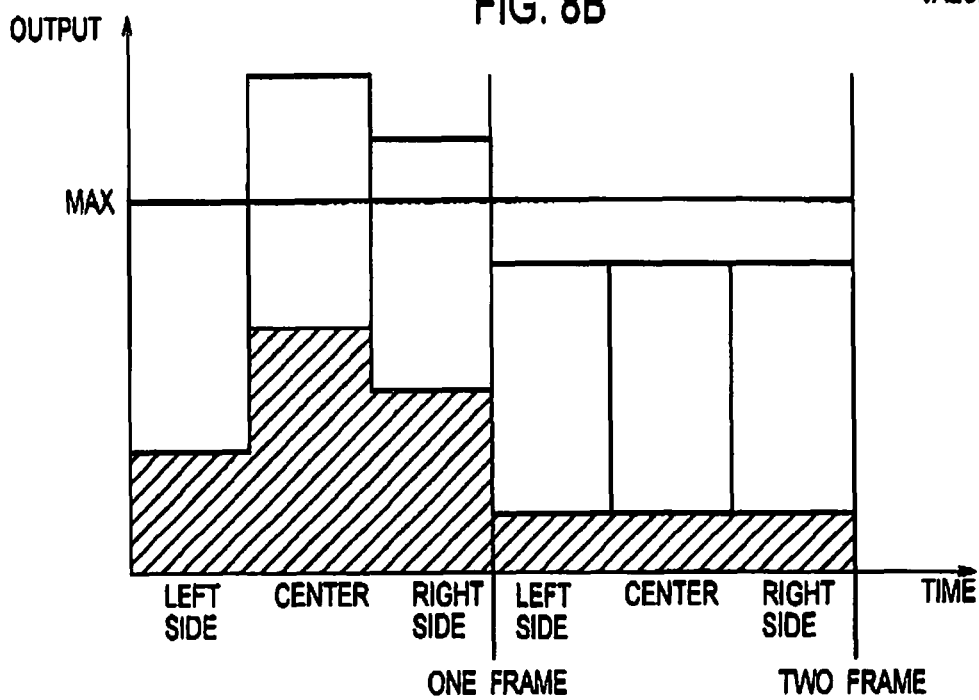

One example of output control of a solid light source 10 according to the second embodiment will be described below by referring to the drawing. FIGS. 8A and 8B are graphs showing one example of output control of the solid light source 10 according to the second embodiment. Note that in FIGS. 8A and 8B, the description will be given by using a case, as an example, where luminance on the left and right sides of a scanning line in frame 1 is lower than luminance in the center of the scanning line, and luminance of a scanning line in frame 2 is lower than the luminance of the scanning line in frame 1.

As shown in FIG. 8A, a projection-type image display device 100 integrates input video signals on which reverse γ correction process is performed over a plurality of frames to calculate integrated values corresponding to scanning lines. Next, the projection-type image display device 100 calculates luminance improving coefficients based on the integrated values corresponding to the plurality of frames.

As shown in FIG. 8B, the projection-type image display device 100 takes values, as outputs of the solid light source 10, obtained by respectively multiplying reference outputs determined according to the input video signals by the luminance improving coefficients. That is, an output of the solid light source 10 is to be an output that a reference output and an additional output are combined.

In this manner, the outputs of the solid light source 10 on the left, center, and right sides in frame 1 are larger than those in FIG. 6B. However, the integrated value obtained by respectively multiplying the reference outputs by the luminance improving coefficients in predetermined observation periods (here, two frames) does not exceed the integrated value of the output maximum values of the solid light source 10.

Note that in FIG. 8B, the luminance improving coefficients each corresponding to the frames are equal, but they are not limited to this. Specifically, the luminance improving coefficients each corresponding to the frames may be changed according to mean luminance of each frame. For example, the luminance improving coefficient corresponding to frame 1 in which the mean luminance is high may be larger than the luminance improving coefficient corresponding to frame 2 in which the mean luminance is low. The luminance improving coefficient corresponding to frame 2 in which the mean luminance is low may be 1 (that is, the reference output is not needed to be changed).

Third Embodiment

A third embodiment of the present invention will be described below by referring to the drawings. In the following, the description will be mainly given to differences between the above-mentioned first embodiment and the third embodiment.

Specifically, in the above-mentioned first embodiment, the integrator (the integrator 230) integrates the input video signals for each scanning line, to calculate integrated values each corresponding to scanning lines. The calculator (the coefficient calculator 240) calculates luminance improving coefficients each corresponding to the solid light sources based on the integrated values each corresponding to the scanning lines.

In contrast, in the third embodiment, an integrator integrates input video signals as an entire light valve (a liquid crystal panel 40) to calculate an integrated value corresponding to the entire light valve. A calculator (a coefficient calculator 240) calculates luminance improving coefficients each corresponding to solid light sources based on the integrated value corresponding to the entire light valve.

(Scanning Method of Light Emitted from the Solid Light Source)

Figure 9:
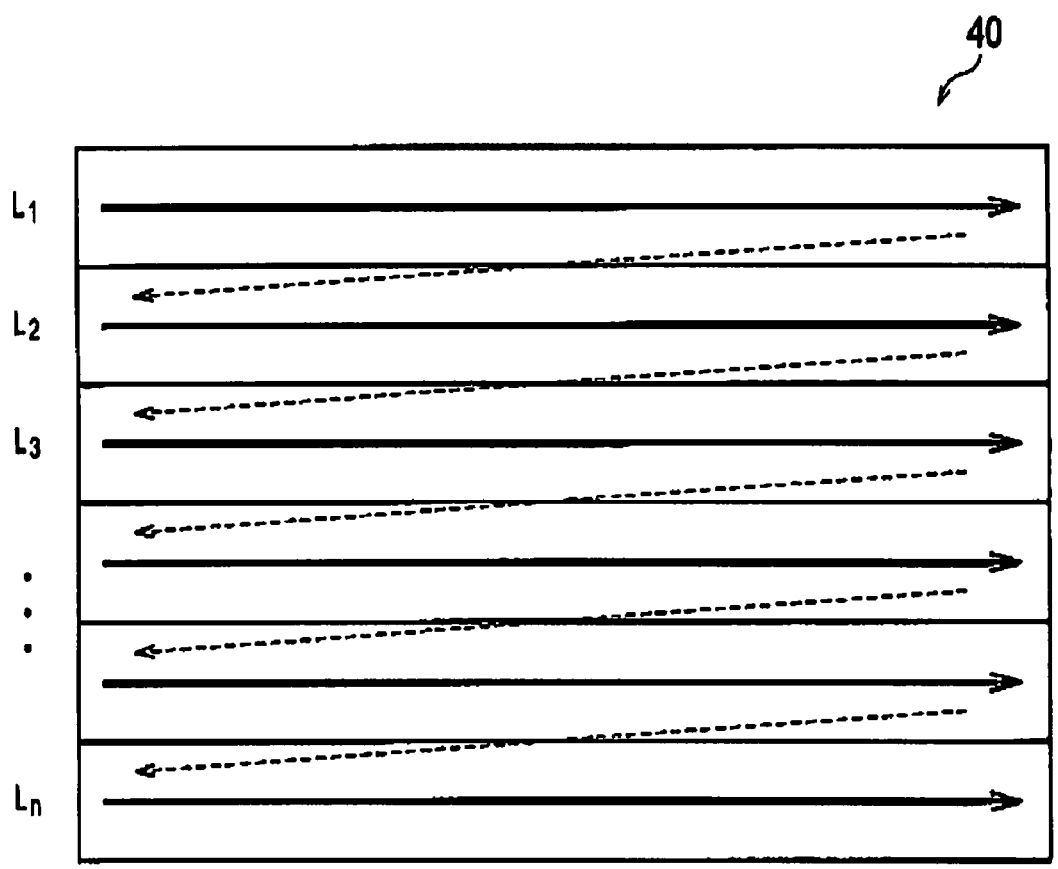
FIG. 9 is a view showing a scanning method of light emitted from a solid light source 10 according to a third embodiment.

A scanning method of light emitted from the solid light source 10 according to the third embodiment will be described below by referring to the drawing. FIG. 9 is a conceptual view showing an operation of a single solid light source 10 scanning an entire light modulation surface (an image display surface) of the liquid crystal panel 40. Note that similar to the first embodiment, the liquid crystal panel 40 has a configuration in which pixels are arrayed in horizontal and vertical directions, each pixel being a unit of which light amount is controlled by input video signals.

As shown in FIG. 9, light emitted from the single solid light source 10 is caused to perform scanning along scanning lines (scanning lines $L_1$ to $L_n$) being horizontal lines. Here, the light emitted from the single solid light source 10 is caused to perform scanning from the scanning line $L_1$ to the scanning line $L_n$ in this order. In addition, if the scanning of the scanning line $L_n$ is finished, scanning is restarted after returning to the scanning line $L_1$.

(Configuration of a Control Unit)

Figure 10:
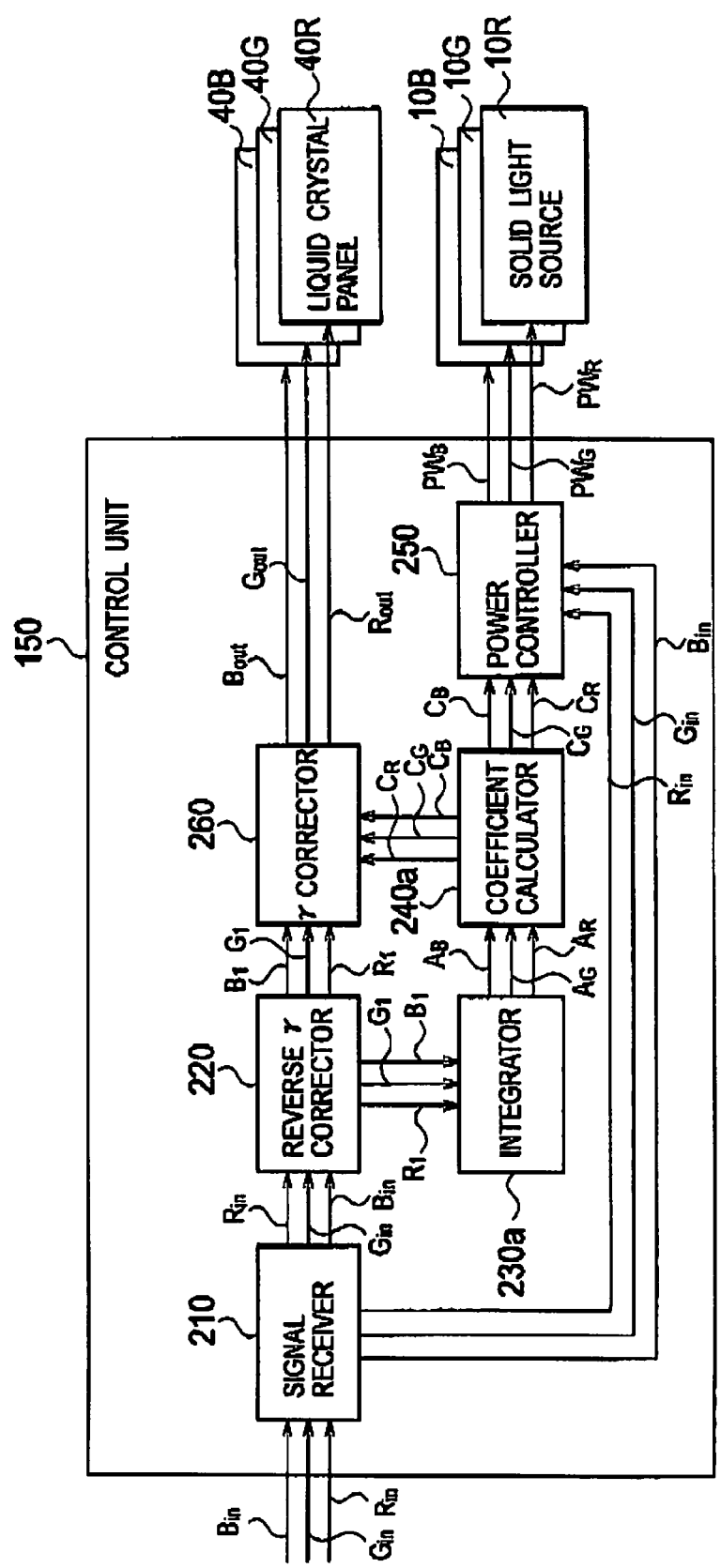
FIG. 10 is a block diagram showing a configuration of a control unit 150 according to the third embodiment.

A configuration of a control unit provided in the projection-type image display device according to the third embodiment will be described below by referring to the drawing. FIG. 10 is a block diagram showing a configuration of a control unit 160 according to the third embodiment. Note that in FIG. 10, similar reference numerals are given to denote components similar to those of FIG. 4.

As shown in FIG. 10, the control unit 150 has an integrator 230a in place of an integrator 230 and has a coefficient calculator 240a in place of a calculator 240.

The integrator 230a is configured to integrate input video signals in an entire liquid crystal panel 40 to calculate an integrated value corresponding to the entire liquid crystal panel 40. Specifically, the integrator 230a integrates a red input signal R1 (one frame) on which reverse γ correction process is performed to calculate an integrated value $A_R$ corresponding to an entire liquid crystal panel 40R. The integrator 230a integrates a green input signal G1 (one frame) on which the reverse γ correction process is performed to calculate an integrated value $A_G$ corresponding to an entire liquid crystal panel 40G. The integrator 230a integrates a blue input signal B1 (one frame) on which the reverse γ correction process is performed to calculate an integrated value $A_B$ corresponding to an entire liquid crystal panel 40B.

The coefficient calculator 240a is configured to calculate luminance improving coefficients (luminance improving coefficients $C_R$, $C_G$, and $C_B$) each corresponding to the solid light source 10 based on an integrated value corresponding to the entire liquid crystal panels 40 (one frame). Specifically, the coefficient calculator 240a calculates a luminance improving coefficient to the extent that the integrated value of outputs of the solid light source 10 controlled by a power controller 250 does not exceed the integrated value of output maximum values of the solid light source 10.

Note that similar to the first embodiment, it is possible that as the integrated values (the integrated values $A_R$, $A_G$, and $A_B$) corresponding to the entire liquid crystal panel 40 are smaller, the luminance improving coefficients (the luminance improving coefficients $C_R$, $C_G$, and $C_B$) can be made larger.

Fourth Embodiment

A fourth embodiment of the present invention will be described below by referring to the drawings. In the following, the description will be mainly given to denote differences between the above-mentioned first embodiment and the fourth embodiment.

Specifically, in the above-mentioned first embodiment, the integrator (the integrator 230) integrates the input video signals for each scanning line, to calculate the integrated values each corresponding to the scanning lines. The calculator (the coefficient calculator 240) calculates the luminance improving coefficients each corresponding to the solid light sources based on the integrated values each corresponding to the scanning lines.

In contrast, in the fourth embodiment, an integrator integrates input video signals for each of a plurality of blocks to calculate integrated values corresponding to each of the plurality of blocks. A calculator (a coefficient calculator 240) calculates luminance improving coefficients each corresponding to solid light sources based on the integrated values corresponding to each of the plurality of blocks. Note that the plurality of blocks configures a light modulation surface (an image display surface) of a light valve (a liquid crystal panel 40).

(Scanning Method of Light Emitted from the Solid Light Source)

Figure 11:
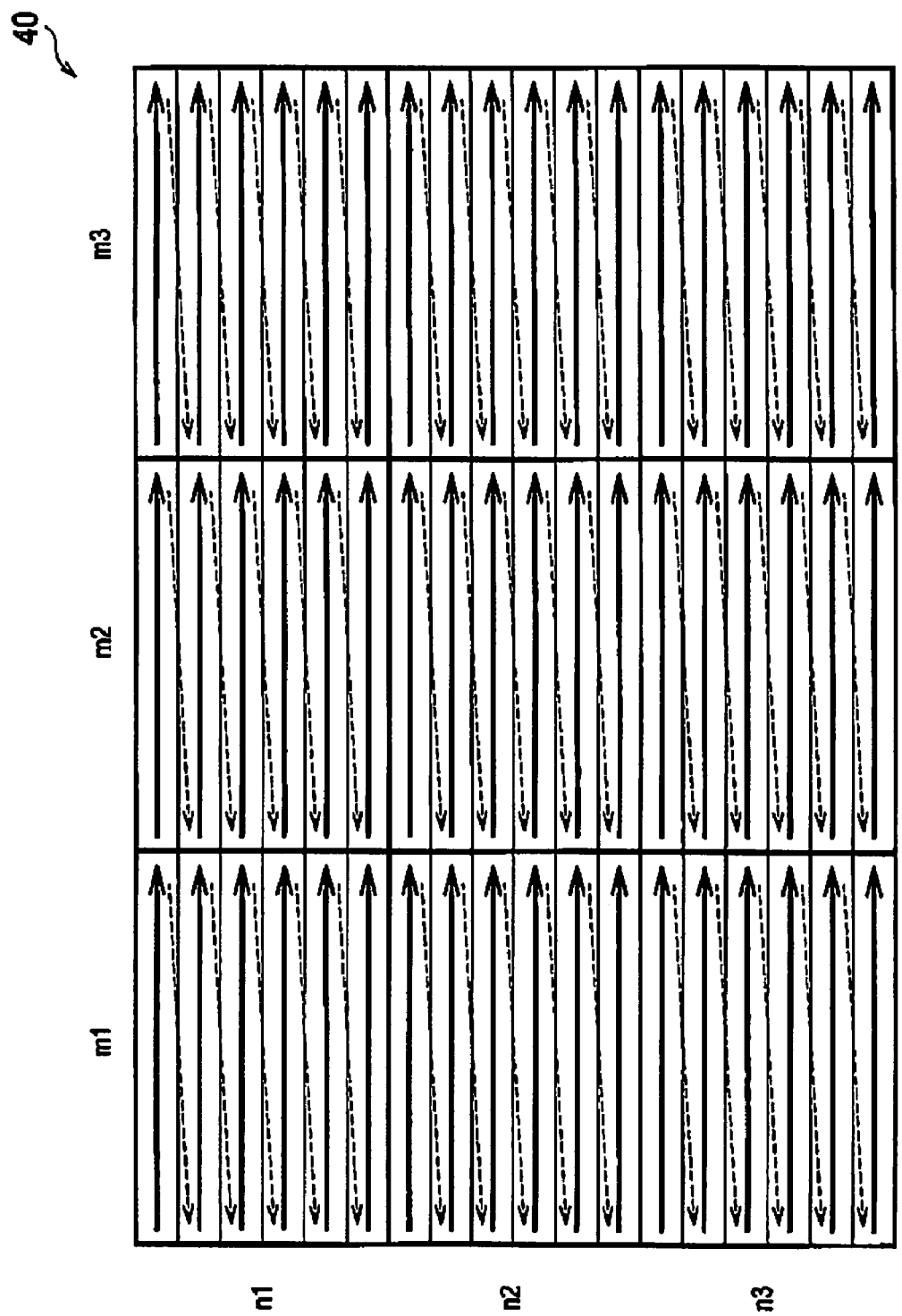
FIG. 11 is a view showing a scanning method of light emitted from a solid light source 10 according to a fourth embodiment.

A scanning method of light emitted from the solid light source 10 according to the fourth embodiment will be described below by referring to the drawing. FIG. 11 is a conceptual view showing an operation that a plurality of solid light sources 10 performs scanning the entire light modulation surface (the image display surface) of the liquid crystal panel 40. Note that similar to the first embodiment, the liquid crystal panel 40 has a configuration that pixels are arrayed in horizontal and vertical directions, each pixel being a unit of which light amount is controlled by input video signals.

As shown in FIG. 11, the light modulation surface (the image display surface) of the liquid crystal panel 40 is configured of a plurality of blocks (m1, n1) to (m3, n3). In each block, a solid light source 10 emitting light scanning in the block is provided. The light emitted from each solid light source 10 is caused to perform scanning in each block along a scanning line being a horizontal line.

(Configuration of a Control Unit)

Figure 12:
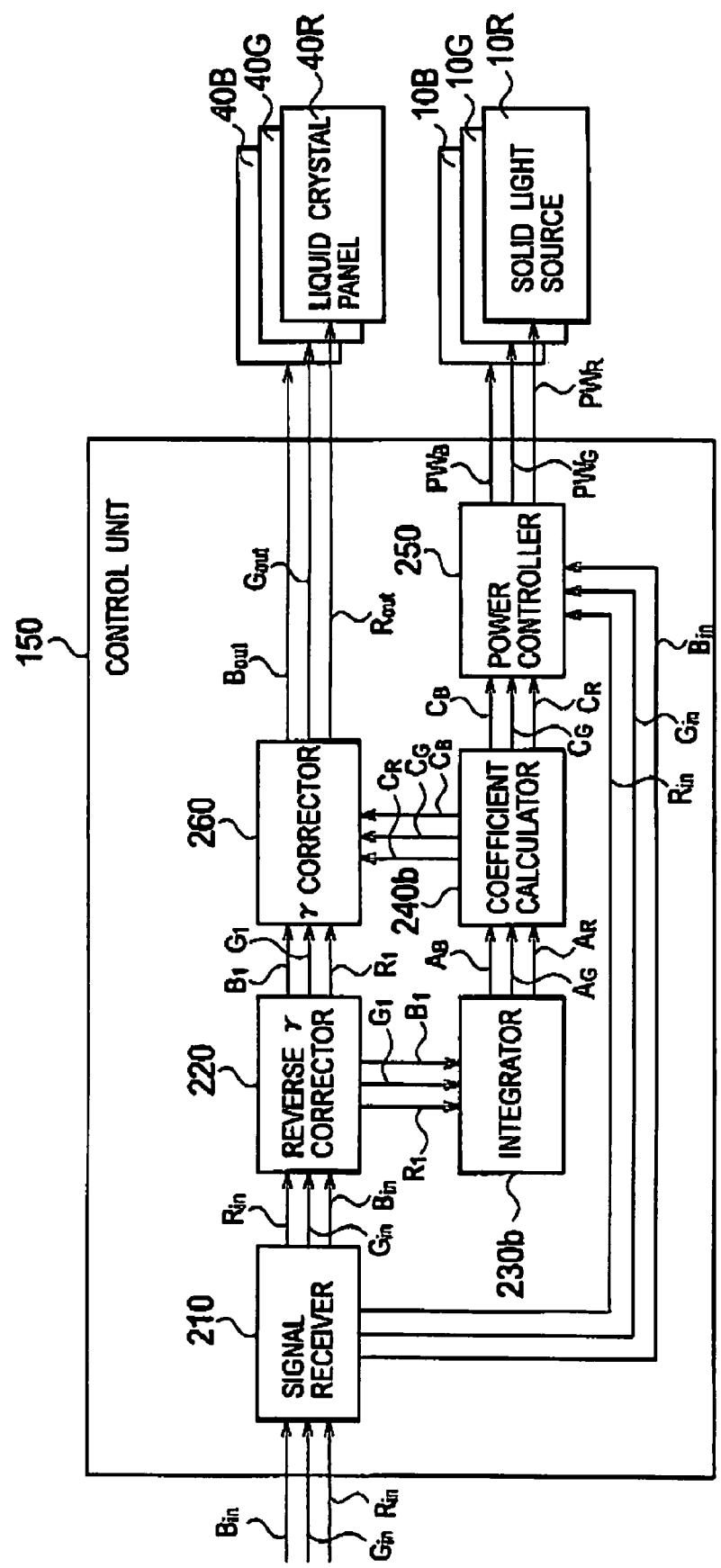
FIG. 12 is a block diagram showing a configuration of a control unit 150 according to the fourth embodiment.

A configuration of a control unit provided in the projection-type image display device according to the forth embodiment will be described below by referring to the drawing. FIG. 12 is a block diagram showing a configuration of a control unit 150 according to the forth embodiment. Note that in FIG. 12, similar reference numerals are given to denote components similar to those of FIG. 4.

As shown in FIG. 12, the control unit 150 has an integrator 230b in place of an integrator 230, and has a coefficient calculator 240b in place of a coefficient calculator 240.

The integrator 230b is configured to integrate input video signals for each of a plurality of blocks to calculate integrated values each corresponding to the blocks. Specifically, the integrator 230b integrates a red input signal R1 on which reverse γ correction process is performed for each of a plurality of blocks to calculate an integrated value $A_R$ corresponding each of the blocks included in a liquid crystal panel 40R. The integrator 230b integrates a green input signal G1 on which the reverse γ correction process is performed for each of a plurality of blocks to calculate an integrated value $A_G$ corresponding to each of the blocks included in a liquid crystal panel 40G. The integrator 230b integrates a blue input signal B1 on which the reverse γ correction process is performed for each of a plurality of blocks to calculate an integrate value $A_B$ corresponding to each of the blocks included in a light crystal panel 40B.

The coefficient calculator 240b is configured to calculate luminance improving coefficients (luminance improving coefficients $C_R$, $C_G$, and $C_B$) corresponding to the solid light source 10 for each of the blocks based on the integrated values each corresponding to the blocks. Specifically, the coefficient calculator 240b calculates a luminance improving coefficient to the extent that the integrated value of outputs of the solid light source 10 controlled by the power controller 250 in a predetermined observation period does not exceed the integrated value of output maximum values of the solid light source 10.

Note that similar to the first embodiment, as the integrated values (the integrated values $A_R$, $A_G$, and $A_B$) corresponding to the entire liquid crystal panel 40 are smaller, the luminance improving coefficients (the luminance improving coefficients $C_B$, $C_G$, and $C_B$) can be made larger.

Fifth Embodiment

A fifth embodiment of the present invention will be described below by referring to the drawing. In the following, the description will be mainly given to denote differences between the above-mentioned fourth embodiment and the fifth embodiment.

Specifically, though it is not particularly described in the fourth embodiment, in the fifth embodiment, it can be suppressed to cause differences in level of luminance of an image in a boundary between blocks adjacent to each other.

In the fifth embodiment, a power controller 250 is capable of controlling an output of a solid light source 10 for each of a plurality of unit regions. That is, the unit region is a minimum unit capable of controlling an output of the solid light source 10. Note that it is assumed that an area of a unit region is smaller than an area of a block. The unit region means, for example, a pixel.

A calculator adjusts a luminance improving coefficient calculated for each block so that a difference between luminance improving coefficients would be reduced between the unit regions adjacent to each other. With this, it can be suppressed to cause a difference in level of luminance of an image in the boundary between the plurality of blocks.

(Adjustment Method of the Luminance Improving Coefficient)

Figures 13, 14:
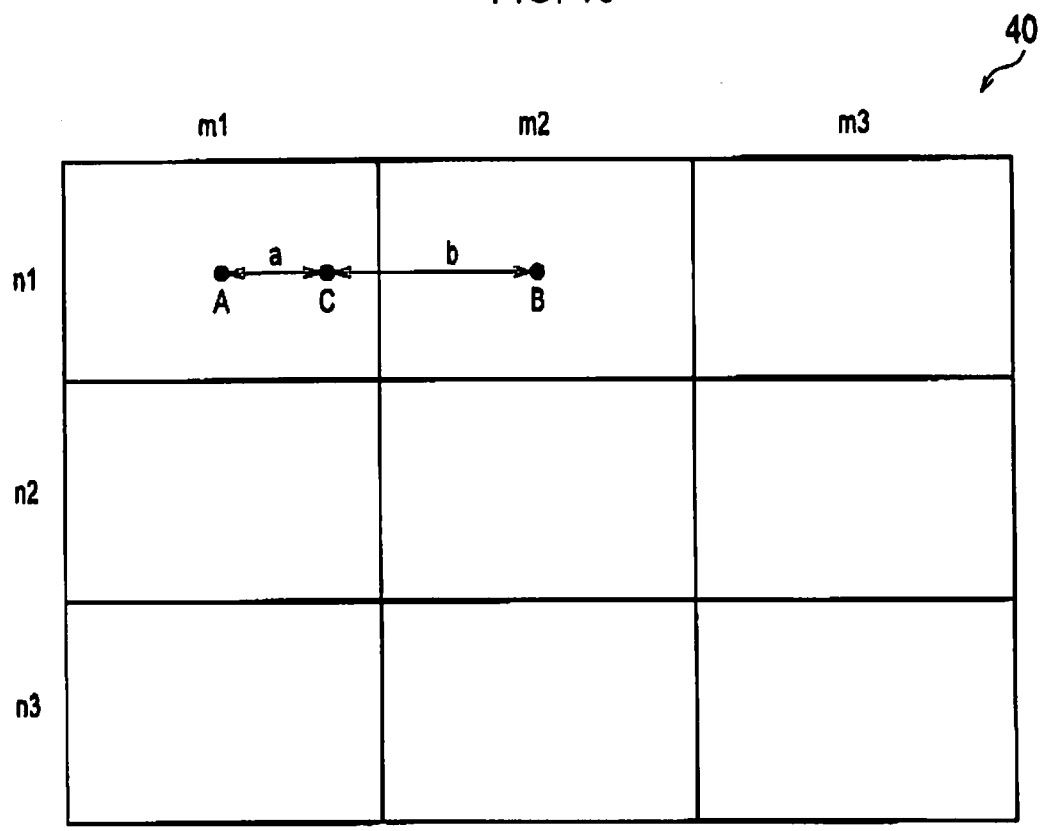
FIG. 13 is a view illustrating an adjustment method of a luminance improving coefficient according to a fifth embodiment.
FIG. 14 is a table illustrating an adjustment method of a luminance improving coefficient according to a sixth embodiment.

An adjustment method of the luminance improving coefficient will be described below by referring to the drawing. FIG. 13 is a view illustrating an adjustment method of the luminance improving coefficient according to the fifth embodiment.

As shown in FIG. 13, similar to the fourth embodiment, a light modulation surface (an image display surface) of a liquid crystal panel 40 is configured of a plurality of blocks (blocks (m1, n1) to (m3, n3)).

Here, a method for adjusting luminance improving coefficients in the block (m1, n1) and the block (m2, n1) will be described as an example. Alphabetic character "A" is the center of the block (m1, n1) and alphabetic character "B" is the center of the block (m2, n1). Alphabetic character "C" is an arbitrary unit region (for example, a pixel) within the block (m1, n1) or the block (m2, n1). Alphabetic character "a" is a distance between alphabetic characters "A" and "B" and alphabetic character "b" is a distance between alphabetic characters "B" and "C". In addition, alphabetic character "$C_{(m1, n1)}$" is a luminance improving coefficient calculated based on an integrated value corresponding to the block (m1, n1). Alphabetic character "$C_{(m2, n1)}$" is a luminance improving coefficient calculated based on an integrated value corresponding to the block (m2, n1).

On the above-mentioned assumption, the coefficient calculator 240b calculates a luminance improving coefficient in "C" ("$C_{(c)}$") according to the formula (1).

$$C_{(c)} = (C_{(m1, n1)} \times b + C_{(m2, n1)} \times a)/(a+b)$$  Formula (1)

In this manner, the coefficient calculator 240b calculates the luminance improving coefficient corresponding to the arbitrary unit region included in the block according to the distance from the centers of the blocks adjacent to each other. That is, the coefficient calculator 240b adjusts the luminance improving coefficient calculated for each block so that a difference between the luminance improving coefficients would be reduced between the unit regions adjacent to each other.

Note that in the fifth embodiment, the luminance improving coefficient corresponding to the arbitrary unit region is calculated based on the luminance improving coefficient corresponding to the two blocks, but the calculation is not limited to this. Specifically, the luminance improving coefficient corresponding to the arbitrary unit region may be calculated based on a luminance improving coefficient corresponding to three or more blocks.

Sixth Embodiment

A sixth embodiment of the present invention will be described below by referring to the drawing. In the following, the description will be mainly given to denote differences between the above-mentioned first embodiment and the sixth embodiment.

Specifically, though it is not particularly described in the first embodiment, in the sixth embodiment, it can be suppressed to cause a difference in level of luminance of an image in frames subsequent to each other.

Specifically, in the sixth embodiment, a calculator adjusts a luminance improving coefficient so that a difference between the luminance improving coefficients would be reduced between the frames subsequent to each other.

(Adjustment Method of the Luminance Improving Coefficient)

An adjustment method of the luminance improving coefficient will be described below by referring to the drawing. FIG. 14 is a table illustrating an adjustment method of the luminance improving coefficient according to the sixth embodiment.

As shown in FIG. 14, a coefficient calculator 240 calculates a luminance improving coefficient for each frame (see, the field of "luminance improving coefficient"). Next, the coefficient calculator 240 adjusts the luminance improving coefficient so that a difference between the luminance improving coefficients would be reduced in the frames subsequent to each other. Note that an adjustment value of the luminance improving coefficient is a mean value of the luminance improving coefficients corresponding to two frames, or the like (see, the field of "two-frame mean value").

Here, the luminance improving coefficient corresponding to frame n–1 is "$C_{(n-1)}$" and the luminance improving coefficient corresponding to frame n is "$C_{(n)}$".

On such an assumption, the coefficient calculator 240 calculates an adjustment value "$C_{(n,\ revised)}$" of the luminance improving coefficient corresponding to the frame n according to the formula (2).

$$C_{(n,\ revised)} = (C_{(n-1)} + C_{(n)})/2 \qquad \text{Formula (2)}$$

In this manner, the coefficient calculator 240 calculates the adjustment value of the luminance improving coefficient so that a difference between the luminance improving coefficients would be reduced in the frames subsequent to each other.

Note that in the sixth embodiment, the adjustment value of the luminance improving coefficient is calculated based on the luminance improving coefficient corresponding to the two frames, but the calculation is not limited to this. Specifically, the adjustment value of the luminance improving coefficient may be calculated based on a luminance improving coefficient corresponding to three or more frames.

As shown in the first embodiment, when a luminance improving coefficient is calculated for each scanning line, an adjustment value of the luminance improving coefficient is calculated on the basis of scanning lines having same positions in the frames.

As shown in the third embodiment, when a luminance improving coefficient is calculated for each frame, an adjustment value of the luminance improving coefficient is calculated for each frame.

As shown in the fourth embodiment, when a luminance improving coefficient is calculated for each block, an adjustment value of the luminance improving coefficient is calculated on the basis of blocks having same positions in the frames.

Other Embodiments

The present invention has been described by the above-mentioned embodiments. However, it should not be understood that the discussion and the drawings constituting a part of this disclosure limit the present invention. Various alternative embodiments, examples, and operating techniques will be apparent for those who are in the art from this disclosure.

For example, in the above-mentioned embodiments, a scanning line corresponds to one pixel line, but the scanning line is not limited to this. Specifically, a scanning line may correspond to a plurality of pixel lines. In this case, an integrated value of the scanning line is an integrated value of input video signals corresponding to the plurality of pixel lines.

In the above-mentioned embodiments, the integrated values of the input video signals are calculated for each scanning line, but the calculation is not limited to this. Specifically, the integrated value of the input video signals may be a value that all of the input video signals corresponding to one frame are integrated.

In the above-mentioned embodiments, a luminance improving coefficient is calculated for each solid light source 10, but the calculation is not limited to this. Specifically, a luminance improving coefficient may be one coefficient which is common in the solid light sources 10.

In the above-mentioned embodiments, a plurality of solid light sources 10 scans a region in a light valve which is allocated in each of the solid light sources 10, but the scanning is not limited to this. Specifically, similar to scanning such as CRT, each of the solid light sources 10 may alternately scan an entire surface of the light valve.

In the above-mentioned embodiments, a liquid crystal panel 40 is described as an example of a light valve, but the light valve is not limited to this. Specifically, the light valve may be a DMD (Digital Micro-mirror Device) or an LCOS (Liquid Crystal on Silicon).

Figure 15:
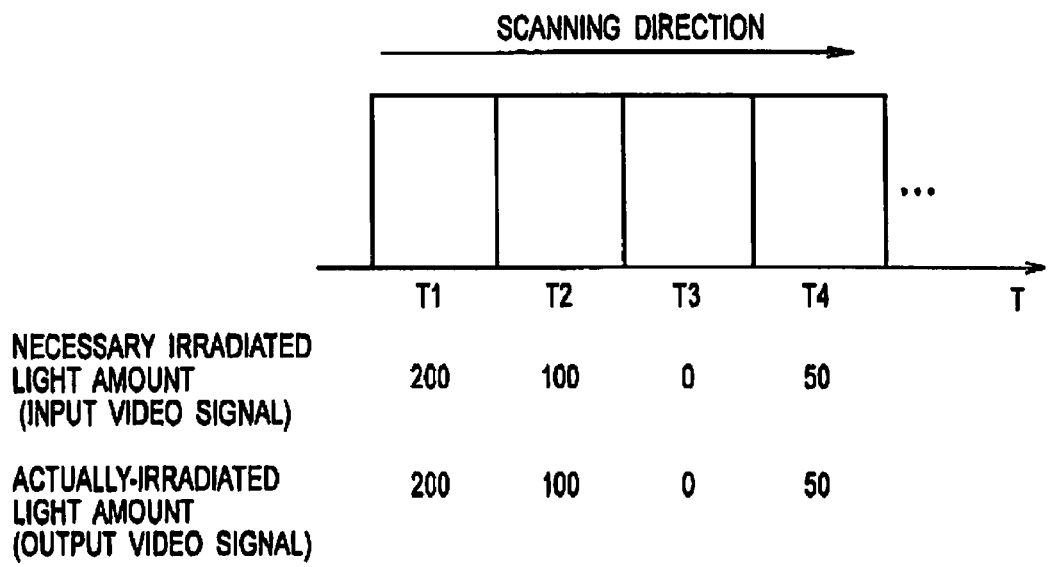
FIG. 15 is a view showing one example of a scanning resolution of spot light emitted from the solid light source 10.

In the above-mentioned embodiments, as shown in FIG. 15, spot light emitted from the solid light source 10 is caused to perform scanning with resolution same as that of a size of spot light in the scanning direction. Thus, at each time (T1, T2, T3, and T4), an actual outgoing light amount (an output video signal) is equal to a necessary irradiated light amount (an input video signal).

Figure 16:
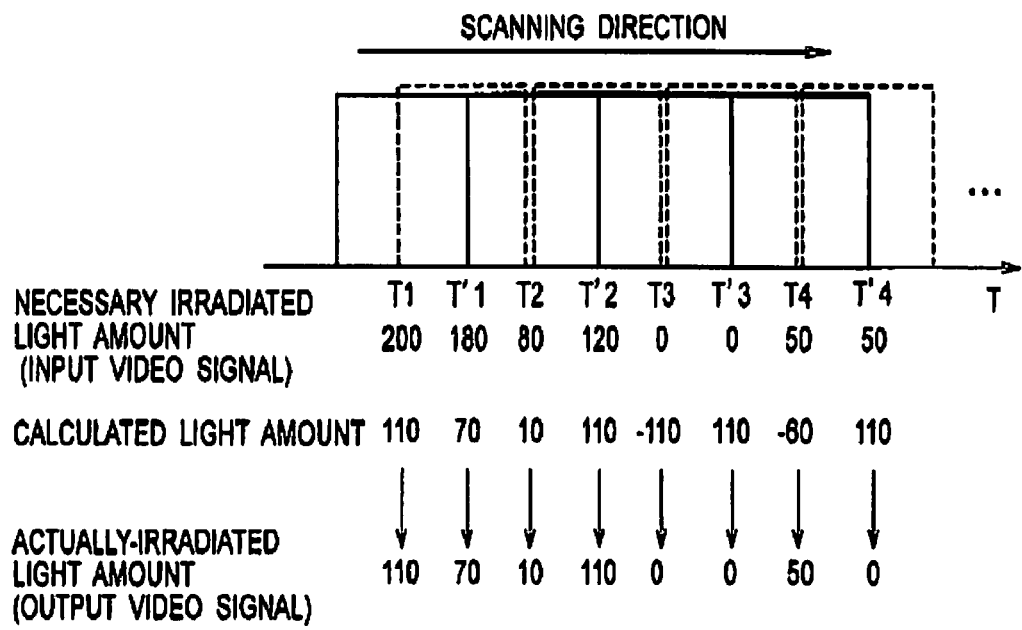
FIG. 16 is a view showing one example of a scanning resolution of spot light emitted from the solid light source 10.

On the other hand, as shown in FIG. 16, spot light emitted from the solid light source 10 may be caused to perform scanning with resolution which is a half of the size of the spot light in the scanning direction. In this case, at each time (T1, T'1, T2, T'2, T3, T'3, T4, and T'4), a calculated light amount to be calculated according to the necessary irradiated light amount will be a difference between the necessary irradiated light amount at each time and the calculated light amount at one time before the previous time. Thus, as shown at time T3, there is a case where the calculated light amount takes a negative value. In this case, when the calculated light amount takes a negative value, a conversion process of converting the actually-irradiated light amount (the output video signal) into "0" is performed.

Furthermore, it is preferable that the actually-irradiated light amount (the output video signal) at time n be a difference between the necessary irradiated light amount (the input video signal) at time n and the actually-irradiated light amount (the output video signal) at time n−1. Thus, when the above-mentioned conversion process is performed at time T3, as shown at time T'3, the actually-irradiated light amount (the output video signal) is to be a difference between the necessary irradiated light amount (the input video signal) at time T'3 and the actually-irradiated light amount (the output video signal) at time T3.

Though it is not particularly described in the above-mentioned embodiments, the third and fourth embodiments may be combined.

Specifically, a luminance improving coefficient may be calculated based on an integrated value corresponding to an entire liquid crystal panel 40 (one frame) and light emitted from each solid light source 10 may be caused to perform scanning for every block. In contrast, a luminance improving coefficient may be calculated for each block based on an integrated value corresponding to the block and light emitted from a single solid light source 10 may perform scanning an entire light crystal panel 40 (one frame).

Furthermore, as a adjustment value of a luminance improving coefficient corresponding to the block (m, n), a mean value of the luminance improving coefficient calculated based on the integrated value corresponding to the entire liquid crystal panel 40 (one frame) and the luminance improving coefficient calculated based on the integrated value corresponding to the block (m, n) may be used.

Though it is not particularly described in the above-mentioned first embodiment, as a adjustment value of a luminance improving coefficient corresponding to a scanning line (L), a mean value of the luminance improving coefficient corresponding to the scanning line (L) and the luminance improving coefficient corresponding to a scanning line adjacent to the scanning line (L) may be used.

Though it is not particularly described in the fifth embodiment, as a adjustment value of a luminance improving coefficient corresponding to the block (m, n), a mean value of the luminance improving coefficient corresponding to the block (m, n) and the luminance coefficient corresponding to a block adjacent to the block (m, n) may be used.

What is claimed is:

1. A projection-type image display device having a solid light source and a light valve, configured to cause light emitted from the solid light source to perform scanning on the light valve along a predetermined scanning line, the projection-type image display device comprising:
    a modulation amount controller configured to control a modulation amount of the light valve according to an input video signal, the input video signal is a video signal inputted to the projection-type image display device;
    an output controller configured to determine a reference output according to the input video signal and to control an output of the solid light source according to the reference output;
    an integrator configured to integrate the input video signal to calculate an integrated value corresponding to the predetermined scanning line; and
    a calculator configured to calculate a luminance improving coefficient based on the integrated value calculated by the integrator; the luminance improving coefficient is to be multiplied by the reference output, wherein
    the output controller controls the output of the solid light source according to a value obtained by multiplying the reference output by the luminance improving coefficient.

2. The projection-type image display device according to claim 1, wherein,
    the predetermined scanning line is configured of a plurality of predetermined scanning lines,
    the integrator calculates the integrated value for each of the plurality of predetermined scanning lines, and
    the calculator specifies a representative value based on the integrated value calculated for each of the plurality of predetermined scanning lines, and calculate the luminance improving: coefficient based on the representative value.

3. The projection-type image display device according to claim 1, further comprising—
    a reverse γ corrector configured to perform reverse γ correction process on the input video signal, wherein,
    the integrator calculates the integrated value γ integrating the input video signal on which the reverse γ correction process is performed.

4. The projection-type image display device according to claim 3, further comprising:
    a γ corrector configured to perform γ correction process on the input video signal according to the luminance improving coefficient, the input video signal on which the reserves γ correction process is performed, wherein,
    the modulation amount controller controls a modulation amount of the light valve according to the input video signal on which the v correction process is performed.

5. The projection-type image display device according to claim 4, wherein,
    the γ corrector performs the γ correction process, in which luminance of an image when the luminance improving coefficient is large would be lower than luminance of an image when the luminance improving coefficient is small.

6. A projection-type image display device having a solid light source and a light valve, configured to cause light emitted from the solid light source to perform scanning on the light valve along a predetermined scanning line, the projection-type image display device comprising:
    a modulation amount controller configured to control a modulation amount of the light valve according to an input video signal, the input video signal is an video signal inputted to the projection-type image display device;
    an output controller configured to determine a reference output according to the input video signal and to control and output of the solid light source according to the reference output;
    an integrator configured to integrate the input video signal to calculate an integrated value corresponding: to the entire light valve: and
    a calculator configured to calculate a luminance improving coefficient based on the integrated value calculated by the integrator, the luminance improving coefficient is to be multiplied by the reference output, wherein,
    the output controller controls the output of the solid light source according to a value obtained by multiplying the reference output by the luminance improving coefficient.

7. A protection-type image display device having a solid light source and a light valve, configured to cause light emitted from the solid light source to perform scanning on the light valve along a predetermined scanning line, the projection-type image display device comprising:

a modulation amount controller configured to control a modulation amount of the light valve according to an input video signal, the input video signal is a video signal inputted to the projection-type image display device;

an output controller configured to determine a reference output according to the input video signal and to control an output of the solid light source according to the reference output:

a light modulation surface of the light valve configured of a plurality of divided regions;

an integrator configured to integrate the input video signal to calculate an integrated value corresponding to each of the plurality of divided regions; and a calculator configured to calculate a luminance improving coefficient for each of the plurality of divided regions based on the integrated value calculated by the integrator, and the luminance improving coefficient is to be multiplied by the reference output, wherein, the output controller controls the output of the solid light source according to a value obtained by multiplying the reference output by the luminance improving coefficient.

8. The projection-type image display device according to claim 7, wherein, a light modulation surface of the light valve is configured of a plurality of unit regions, the output controller is capable of controlling the output of the solid line source for each of the plurality of unit regions, and the calculator adjusts the luminance improving coefficient so as to reduce a difference between the luminance improving coefficients of one unit region and other unit region adjacent to the one unit region, the one unit region and the other unit region are unit regions included in the plurality of unit regions.

9. The projection-type image display device according to any one of claims 1, 6, 7, wherein, the input video signal is a signal corresponding to a plurality of frames, the output controller is capable of controlling the output of the solid light source for each of the plurality of frames, and the calculator adjusts the luminance improving coefficient so as to reduce a difference between the luminance improving coefficients of one frame and other frame subsequent to the one frame, the one frame and the other frame are frames included in the plurality of frames.

* * * * *